(12) United States Patent
Jung et al.

(10) Patent No.: US 7,525,413 B2
(45) Date of Patent: Apr. 28, 2009

(54) APPARATUS SUPPORTING ACTIVE AND PASSIVE TELECOMMUNICATION, AND CONTROL METHOD THEREOF

(75) Inventors: Kwang-Ryul Jung, Daejeon (KR); Sung-Hee Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 403 days.

(21) Appl. No.: 11/024,283

(22) Filed: Dec. 27, 2004

(65) Prior Publication Data
US 2005/0141470 A1 Jun. 30, 2005

(30) Foreign Application Priority Data
Dec. 27, 2003 (KR) .................. 10-2003-0098215

(51) Int. Cl.
*H04Q 5/22* (2006.01)
(52) U.S. Cl. ................. 340/10.1; 340/10.34; 340/10.33
(58) Field of Classification Search ............... 340/10.1, 340/10.34, 10.33, 572.1; 370/338
See application file for complete search history.

(56) References Cited

U.S. PATENT DOCUMENTS 5,525,992 A * 6/1996 Froschermeier ............ 340/10.2

2002/0126013 A1 * 9/2002 Bridgelall ................ 340/572.1
2003/0104848 A1 * 6/2003 Brideglall .................... 455/574
2003/0119568 A1 * 6/2003 Menard ....................... 455/572

FOREIGN PATENT DOCUMENTS

KR 1020010050990 6/2001

OTHER PUBLICATIONS

"Combining paging with Dynamic Power Management", C. Chiasserini, et al. 2001 IEEE, pp. 996-1004.

* cited by examiner

*Primary Examiner*—Edwin C Holloway, III
(74) *Attorney, Agent, or Firm*—Blakely, Sokoloff, Taylor & Zafman LLP

(57) ABSTRACT

Disclosed is an apparatus using a battery and a passive device, and a communication method thereof. In the wireless communication system, a coordinator has an active communication device for supporting active communication, and a passive device for supporting passive communication to wirelessly transmit power to a communication device. The communication device includes a memory and a passive communication device using the power received from the coordinator in a wireless manner in the active communication device operated with the battery, and stays in a passive communication idle state during a period allowing passive communication. The operation of the passive communication device is transmitted to the active communication device via an interrupt device so as to cause an active/passive communication state transition depending on the communication state.

6 Claims, 6 Drawing Sheets

APPARATUS SUPPORTING ACTIVE AND PASSIVE TELECOMMUNICATION, AND CONTROL METHOD THEREOF

CROSS REFERENCE TO RELATED APPLICATION

This application claims priority to and the benefit of Korea Patent Application No. 10-2003-98215 filed on Dec. 27, 2003 in the Korean Intellectual Property Office, the entire content of which is incorporated herein by reference.

BACKGROUND OF THE INVENTION (a) Field of the Invention

The present invention relates to an apparatus and method for reducing power consumption of a communication device using batteries to extend the operating time of the device. More specifically, the present invention relates to an apparatus and method for reducing power consumption by controlling the efficient switching of operation between active and passive communication devices.

(b) Description of the Related Art

Power saving is of great importance in various devices, including communication devices such as mobile communication terminals, mobile Internet terminals, WPAN (Wireless Personal Area Net) terminals, and sensor network nodes.

The communication device, with the power on, stays in the idle stat most of the time. In the idle state, the communication device periodically receives broadcasting information from a base station, an access point, or a coordinator, and updates the related information.

The communication device also receives paging information from the coordinator to compare a received ID with its own, and if the received ID matches its own, performs a paging response procedure. With a change in the location as the terminal travels, the communication device registers the changed location on the coordinator.

In this manner, the periodic operation of the terminal in the idle state results in power consumption caused by a state transition of the communication device, and data transmission/reception, and hence reduces the operating time of the terminal.

In a conventional method, a passive signal discriminator for wake-up of a low-voltage responsor has a structure that prevents unnecessary wake-up of the low-voltage responsor caused by noise signals generated from a television or a monitor.

In this method, the low-voltage responsor is provided with an additional low-pass filter having a specific threshold value, so as to decrease the number of unnecessary wake-ups caused by noise and reduce power consumption of the low-voltage responsor efficiently. Furthermore, since the passive low-pass filter does not consume battery power, it actually reduces unnecessary power consumption.

This method is useful in the case where the coordinator and the terminal exist in one-to-one correspondence and their communication procedure is extremely simple. But, it is ineffective when multiple terminals are present in one area and the related communication procedure is complicated, as in the mobile communication environment.

In another conventional method, the paging integration dynamic power management method, the state to which the communication device can transit is divided into several steps, and the communication device is transited to a deep idle state to acquire a power gain greater than the power consumption caused by the state transition, the corresponding state being maintained for a sufficient time period. Thus the power consumption caused by frequent state transitions can be reduced. The communication device includes a passive receiver and a decoding logic in addition to basic communication devices, to perform reception and comparison of group paging codes with the passive receiver and the decoding logic.

In this method where the paging unit comprises group units, however, the terminal which wants to check paging information for itself is required to receive a paging list through an active communication device and to check whether or not its ID is in the paging list.

Most of all, when the passive receiver of the terminal is located in the environment (e.g., the shadow area not suitable for the reception of the power transmit signal of the coordinator) that does not support a normal operation of the passive receiver, the conventional methods do not provide a means for checking whether the paging information of the coordinator is successfully received. Additionally, the periodically received broadcasting information of the coordinator cannot be processed, resulting in difficulty in actively performing the mutual operations between the active and passive communication devices.

SUMMARY OF THE INVENTION

It is an advantage of the present invention to provide an apparatus and method for reducing power consumption by efficiently performing mutual compensation between active and passive devices in multiple environments such as mobile communication.

To achieve the above object, the present invention adds a passive device receiving power supply by the signal of a coordinator to an active device using batteries so as to process the periodic operation of the terminal in the idle state, and provides an interrupt device to compensate for the mutual operation procedures of the active and passive devices.

In one aspect of the present invention, there is provided a control method for an operation of a communication device that includes: (a) an active device activating the interrupt device to monitor an operation of the passive device, when power is on; (b) upon receiving passive broadcasting information, a passive communication device recording the broadcasting information on a common memory, and reporting a reception of the passive broadcasting information to the interrupt device; (c) an interrupt device reporting the reception of the passive broadcasting information to the active device; and (d) the active device transiting a state of a terminal device to a passive idle state and operating as a passive device.

In another aspect of the present invention, there is provided a communication device that includes: an active communication device for performing communication by using a power source thereof; an active communication device antenna being used for signal transmission/reception of the active communication device; a passive communication device for performing communication by using an electric field or a magnetic field provided by a coordinator; a passive communication device antenna being used for signal transmission/reception of the passive communication device; a passive common memory; an interrupt device for monitoring an operation of the passive communication device and transmitting the monitoring result to the active communication device; and a central processor unit (CPU) for controlling the operations of the passive communication device and the active communication device.

In addition, the coordinator which is for transmitting broadcasting information, data, and power to the device includes: a power source; an active communication device for receiving power from the power resource and transmitting active broadcasting information and data to the communication device; a passive communication device for receiving power from the power source and transmitting a power comprising a magnetic field or an electric field, and passive broadcasting information to the communication device; a CPU for controlling operations of the passive communication device and the active communication device; and a main memory for storing information about the communication device.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals. In addition, a connection between one part to another includes a direct connection between them, or an electrical connection via a third device.

Hereafter, a detailed description will be given as to a communication method and system using active and passive devices according to an embodiment of the present invention.

Figure 1:
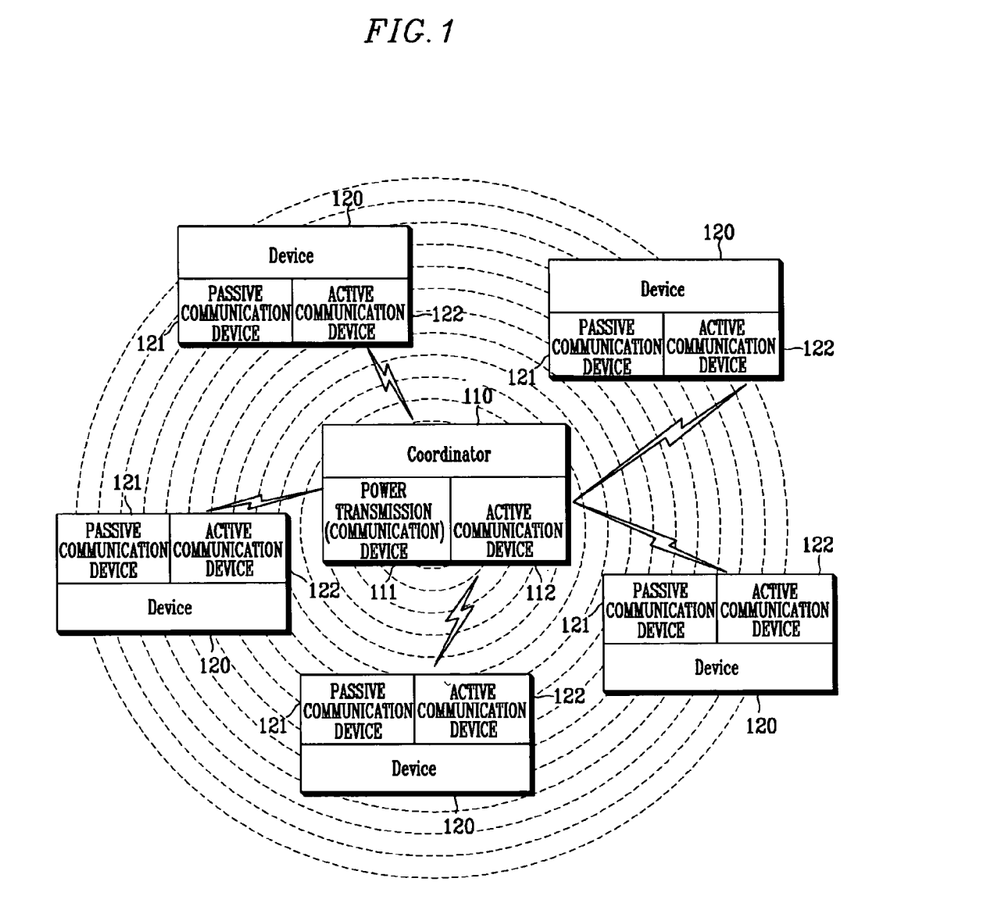
FIG. 1 is a schematic of a communication system according to an embodiment of the present invention.

FIG. 1 is a schematic of a communication system according to an embodiment of the present invention.

The communication system according to an embodiment of the present invention comprises one coordinator 110, and a plurality of devices 120.

The coordinator 110, which comprises a passive communication device 111 and an active communication device 112 for power transmission and communication, periodically transmits broadcasting information (e.g., a beacon) as a base station of a cellular system or an access point (AP) of a wireless LAN to maintain synchronization in the network, manage resources, and call a terminal. In addition, the coordinator 110 transmits data to a specific device.

The passive communication device 111 periodically transmits signals to establish a magnetic/electric field 130 for devices operating passively in the communication area, and broadcasting information. The active communication device 112 not only transmits broadcasting information for a device operated with its own batteries in the area, and but also communicates data with a specific device.

The device 120 comprises a passive communication device 121 and an active communication device 122. The passive communication device 121 generates power from the magnetic/electric field 130 formed by the coordinator 110 and uses the generated power to receive the broadcasting information from the coordinator 110. The active communication device 122 drives the communication device by using its own batteries to receive the broadcasting information from the coordinator 110 and responds to a call.

Therefore, the device 120 of the present invention includes both the passive communication device and the active communication device for compensation of the mutual operations of the two communication devices, thus performing a power saving operation.

Figure 2:
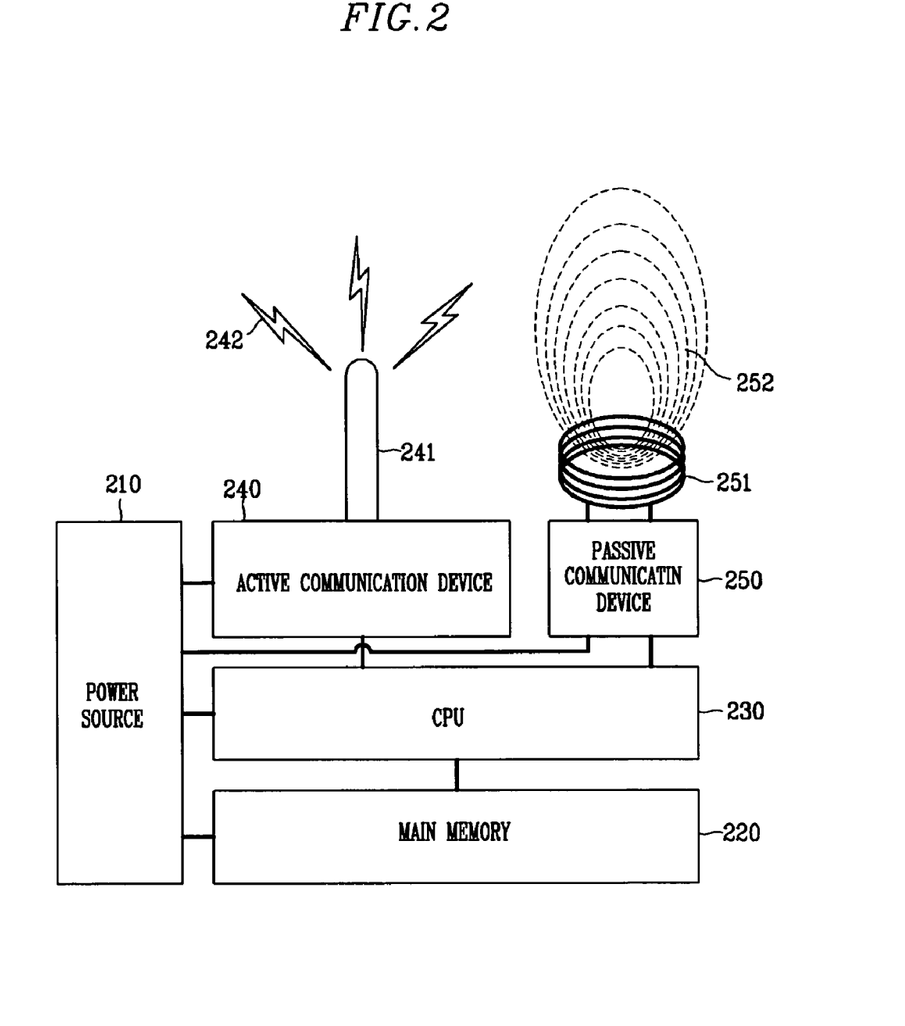
FIG. 2 is a block diagram of a coordinator according to an embodiment of the present invention.

FIG. 2 is a block diagram of the coordinator according to an embodiment of the present invention.

The coordinator 110 comprises a power source 210, a main memory 220, a central processor unit (CPU) 230, an active communication device 240, an active communication device antenna 241, a passive communication device 250, and a passive communication device antenna 251.

The coordinator 110 consumes a lot of power because it performs system control, synchronization maintenance, and communication with devices. Thus, the power source 210 of the coordinator 110 receives power directly from a power line, or uses fuel cells.

The main memory 220 stores information about the devices connected to the coordinator 110, transmitted data, and so forth. The CPU 230 executes algorithms necessary to the coordinator 110, such as scheduling, resource control, etc. and controls the active/passive communication device.

The active communication device 240, which is a general communication device, receives power from the power source 210 to communicate with the device by using the active communication device antenna 241. The passive communication device 250 receives power from the power source 210 to communicate with the passive communication device 210 of the device. For this operation, the passive communication device 250 provides a construction 252 of a magnetic/electric field in a specific area by using the passive communication device antenna 251, to transmit power to the passive communication device of the device, and broadcasting information.

Figure 3:
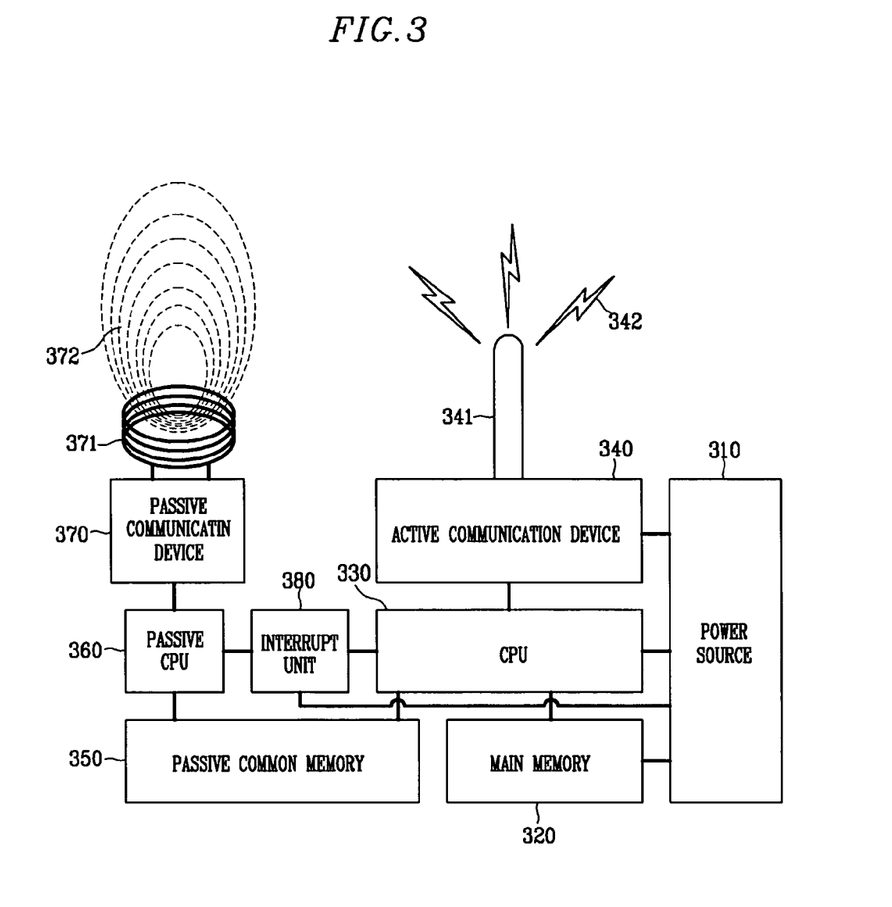
FIG. 3 is a block diagram of a device according to an embodiment of the present invention.

FIG. 3 is a block diagram of the device according to an embodiment of the present invention.

The device 120 comprises a power source 310, a main memory 320, a CPU 330, an active communication device 340, an active communication device antenna 341, a passive common memory 350, a passive CPU 360, a passive communication device 370, a passive communication device antenna 371, and an interrupt device 380.

The device, which is fixed at a specific location or is portable by a person, is typically smaller in size than the coordinator. For such a portability and mobility, the device can use batteries or solar cells as the power source 310.

The main memory 320 stores user information, broadcasting information of the coordinator, information about applications used in the terminal, etc. The CPU 330 is in charge of not only basic algorithms but also the control of the active communication device 340, the interface with the interrupt device 380, etc. The active communication device 340, which is a general communication device, receives power from the power source 310 and communicates with the coordinator by using the active communication device antenna 341.

The passive common memory 350 receives power from a magnetic/electric field 372 of the coordinator via the passive communication device antenna 371, and stores the broadcasting information analyzed by the passive CPU 360 and basic device information. Like an EEPROM, the passive common memory 350 preferably keeps the stored data even during interruption of power supply.

The passive CPU 360 receives power from the magnetic/electric field 372 of the coordinator via the passive communication device antenna 371, controls the passive common memory 350 and the passive communication device, and extracts/analyzes the data received by the passive communication device 370. The passive communication device 370 uses the passive communication device antenna 371 to receive power from the magnetic/electric field 372 of the coordinator, receives the broadcasting information of the coordinator, and in some cases, transmits data.

The interrupt device 380 receives power from the power source 310, determines whether or not the passively operating devices are in operation, and reports the determination result to the active device.

As stated previously, the passive communication device 370, the passive CPU 360, and the passive common memory 350 are operated with power supply from the electric/magnetic field formed by the coordinator, rather than using the batteries of the device.

Hereinafter, the operation method of the communication system of the present invention will be described in detail.

Figure 4:
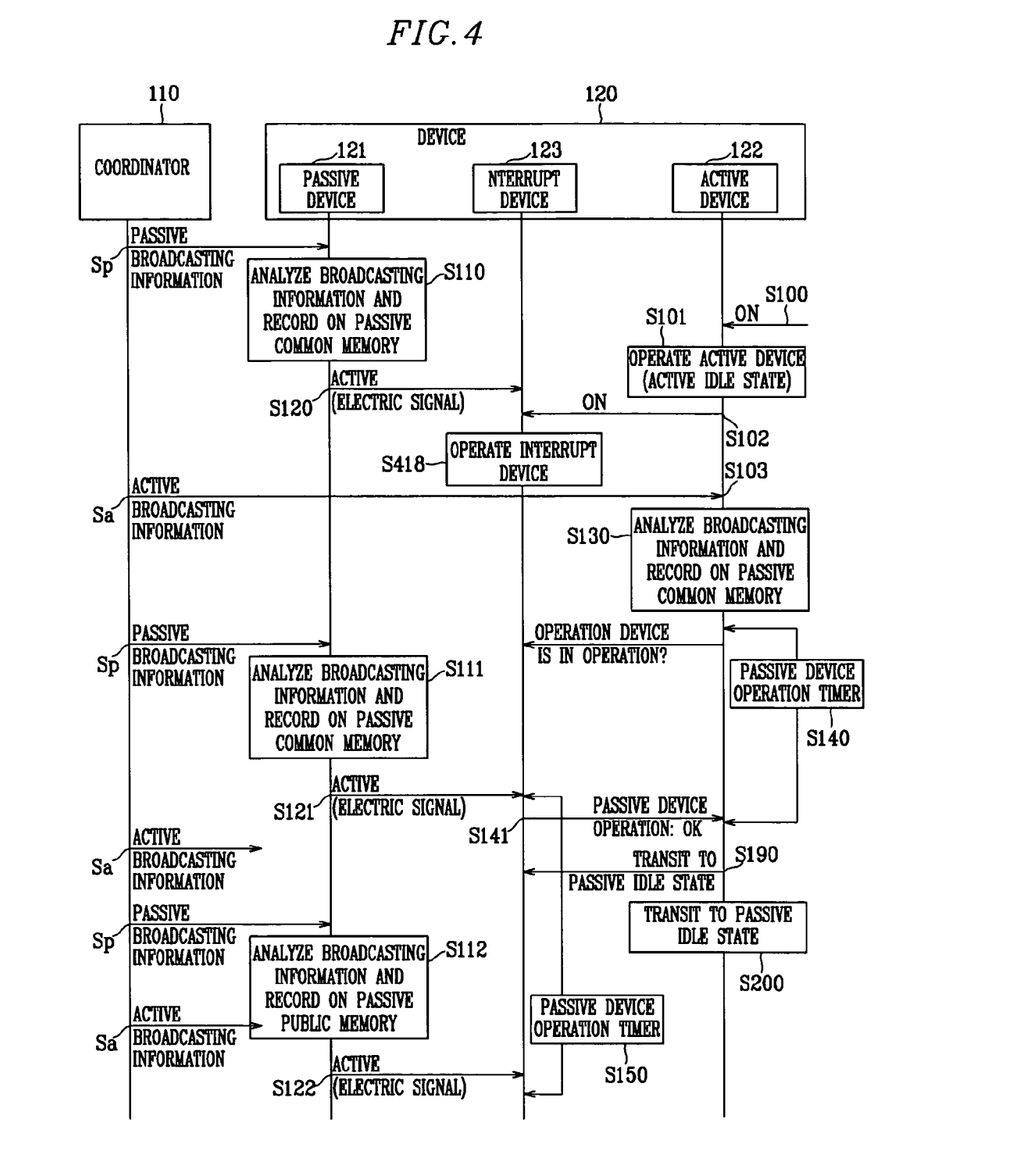
FIG. 4 is a signal flow chart showing an operation of the device with the power on according to an embodiment of the present invention.

FIG. 4 is a signal flow chart showing an operation of the device with the power on according to an embodiment of the present invention.

The coordinator 110 periodically transmits passive broadcasting information Sp and active broadcasting information Sa. The passive broadcasting information Sp comprises a signal constituting a magnetic/electric field, and broadcasting information.

First, the operation of the device with the power off will be described.

The passive device 121 of the device 120 responds to the periodic passive broadcasting information irrespective of power supply, to receive broadcasting information, analyze the corresponding information, and record information related to the passive common memory, in step S110.

The passive device 121 transmits an "active" signal to the interrupt device 123, in step S120. However, the interrupt device with the power off cannot receive the "active" signal.

When the power is applied to the device, in step S100, the active devices such as the main memory, the CPU, and the active communication device of the device 120 are supplied with the power to maintain an active idle state, in step S101.

In the active idle state, the device 120 performs an operation in the idle state with the active device using batteries. The active device transmits a signal to the interrupt device to turn the power on, in step S102. Upon receiving the power apply signal, the interrupt device 123 waits for the "active" signal from the passive device.

After turning the interrupt device 123 to be in operation, the active device receives active broadcasting information, in step S103, and analyzes the corresponding information and records the analyzed information on the passive memory, in step S130.

Subsequently, the active device operates a passive device operation timer to check whether or not the passive device is in operation, in step S140, and transmits a "passive device operation inquiry" signal to the interrupt device 123.

Upon receiving the periodic passive broadcasting information Sp, the passive device analyzes the corresponding information and records information related to the passive common memory, in step S111, and transmits the "active" signal to the interrupt device 123, in step S121.

Upon sequentially receiving the "passive device operation inquiry" signal of the active device and the "active" signal of the passive device, the interrupt device 123 operates the passive device operation timer and reports to the active device that the passive device is in operation, in step S141.

Upon checking the operation of the passive device 121 before the active device operation timer expires, the active device 122 reports its state transition to the interrupt device 123, in step S190, and performs a state transition to a passive idle state, in step S200.

In the passive idle state, the active device 122 is not in operation until requested by the user or receiving a "wake-up" signal of the interrupt device, and it performs an idle state operation by the passive device 121. Upon receiving a report on the state transition of the active device 122 to a passive idle state, the interrupt device 123 determines in step S122 whether or not the "active" signal is received from the passive device, and operates the timer depending on the determination result of the step S122 to monitor the operation status of the passive device, in step S150.

In response to the periodic passive broadcasting information Sp, the passive device 121 receives related information and analyzes/records the received information, in step S112, and transmits the "active" signal to the interrupt device 123, in step S122. The device 120 continuously operates by way of the passive device and does not consume power after the state transition to the idle state.

Figure 5:
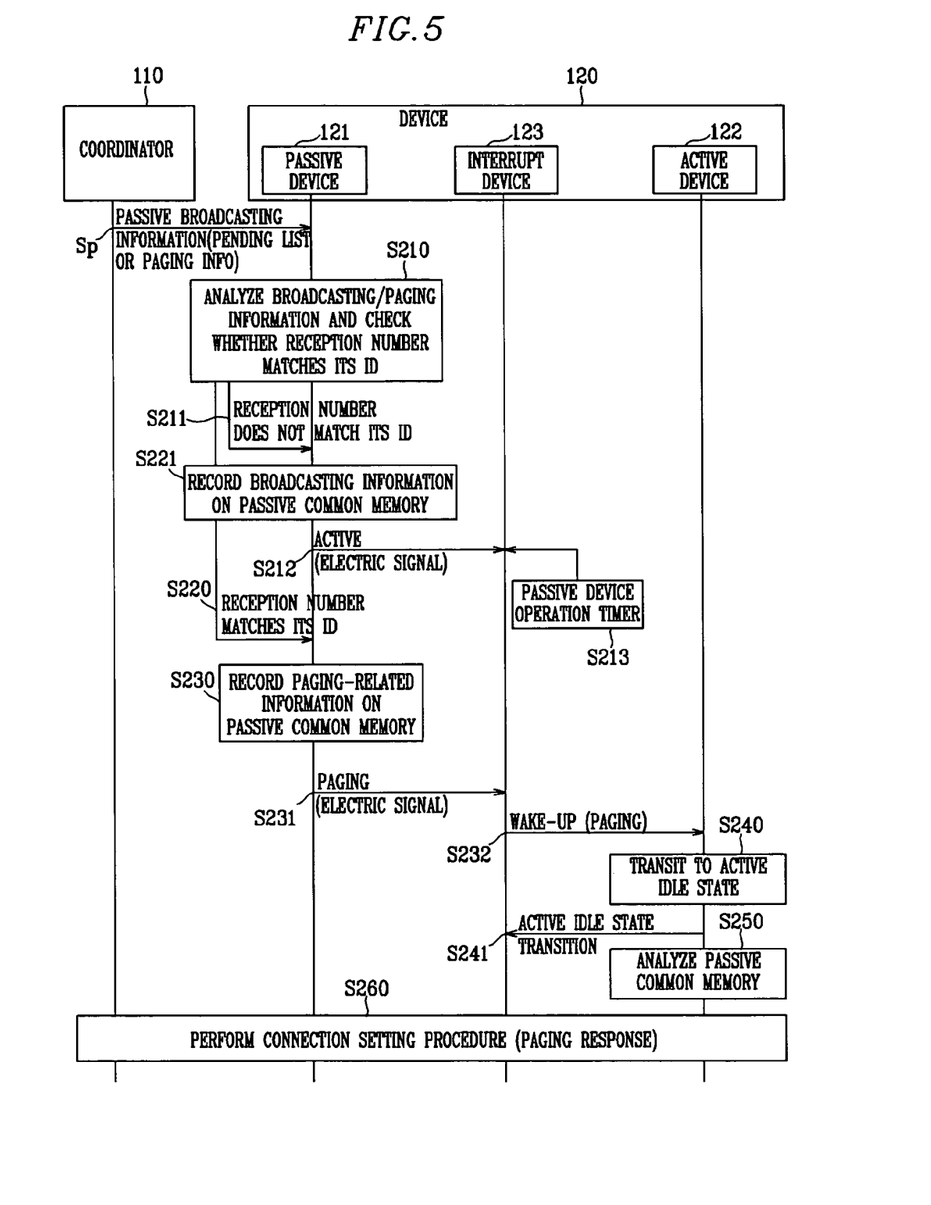
FIG. 5 is a signal flow chart showing an operation of a passive communication device receiving paging information according to an embodiment of the present invention.

FIG. 5 is a signal flow chart showing an operation of the passive communication device receiving paging information according to an embodiment of the present invention.

When the coordinator 110 transmits passive broadcasting information including paging information for a specific device, the passive device 121 of the device 120 responds to the passive broadcasting information irrespective of power supply to receive the broadcasting information, extracts information such as paging reason, transmitter, or reception number (e.g, IMSI, 64-bit IEEE address, etc.), and checks whether or not the reception number matches its own ID, in step S210.

If the reception number does not match the ID of the passive device 121, in step S211, then the passive device 121 ignores the corresponding paging information and transmits the "active" signal to report the reception of the broadcasting information to the interrupt device 123, in step S212. Upon receiving the "active" signal, the interrupt device operates the passive device operation timer again to perform a normal broadcasting information reception procedure by the passive device, in step S213.

If the reception number matches the ID of the passive device, in step S220, then the passive device 121 records the broadcasting information on the passive common memory, in step S230, and transmits a "paging" signal to the interrupt device 123, in step S231. Upon receiving the "paging" signal, the interrupt device 123 transmits a "wake-up" signal by paging to the active device 122 and wakes up the active device, in step S232. The active device 122, upon receiving the "wake-up" signal, transits its state to an active idle state and reports the state transition to the interrupt device, in steps S240 and S241.

Subsequently, the active device 122 analyzes the paging information of the passive common memory, in step S250, and performs a connection setting procedure (paging response procedure) using the active device depending on the related information, in step S260.

Upon receiving information about the operating state transition of the active device, the interrupt device 123 does not check whether or not the passive device is in operation, until the active device inquires of the operating state of the passive device or reports its state transition as a passive idle state.

Figure 6:
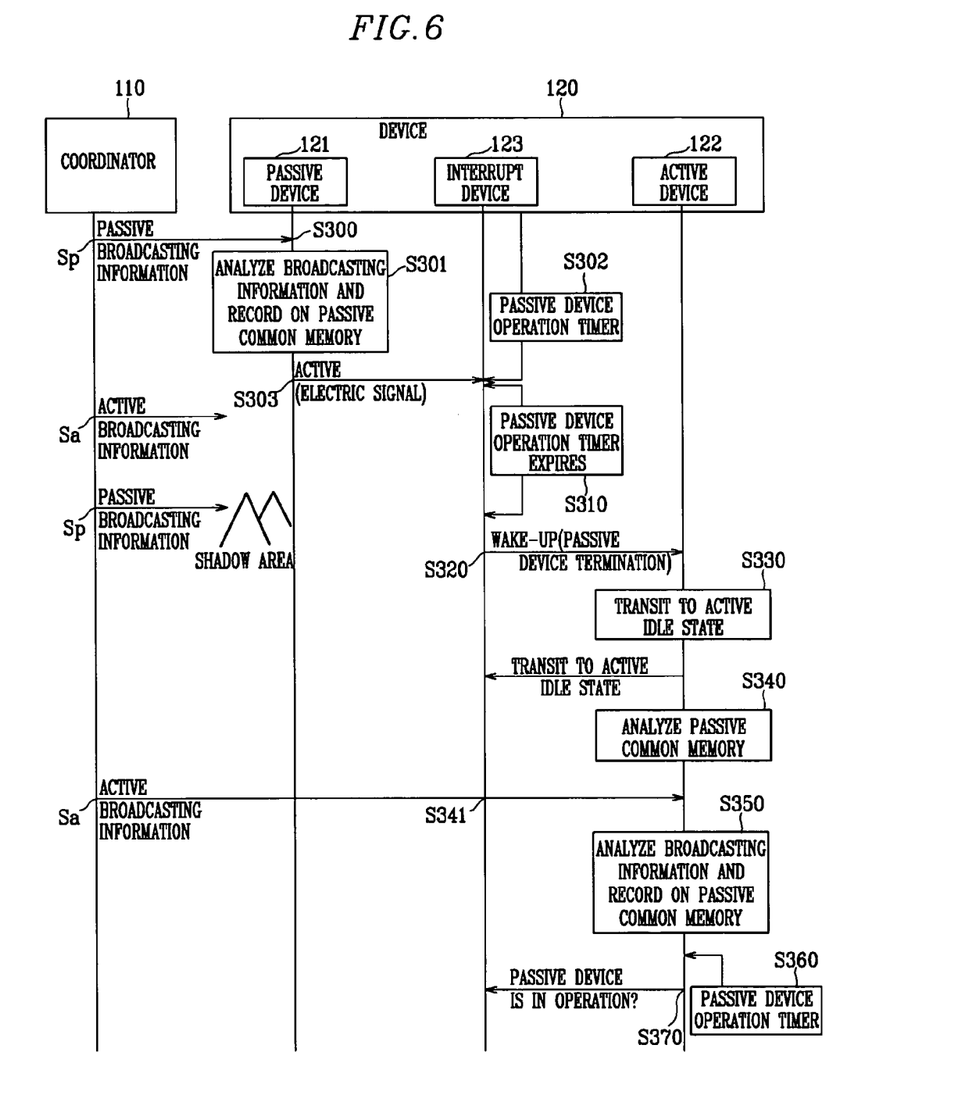
FIG. 6 is a signal flow chart showing an operation of a communication system in shadow area according to an embodiment of the present invention.

FIG. 6 is a signal flow chart showing an operation of the communication system in a shadow area according to an embodiment of the present invention.

FIG. 6 shows an operation procedure in which the device cannot receive the magnetic/electric field construction signal of the coordinator 110 for a certain reason. The device 120 in the passive idle state receives the passive broadcasting information Sp of the coordinator, analyzes the corresponding information, and records the related information on the passive common memory, in step S301. Then the device 120 transmits the "active" signal to the interrupt device, in step S303.

Before the passive device operation timer expires, the interrupt device 123, upon receiving the "active" signal, operates the passive device operation timer again to monitor the operation of the passive device, in step S302. At this time, the active device of the device is in the passive idle state and not in operation, so the device 120 does not process the active broadcasting information Sa of the coordinator.

In the case where the device cannot receive the passive broadcasting information of the coordinator because of an obstruction such as a building or a mountain, the passive device is not in operation, and so the passive device operation timer of the interrupt device expires.

When the timer expires, in step S310, the interrupt device transmits a "wake-up" signal indicating the termination of the passive device to the active device, to wake up the active device, in step S320. Upon receiving the "wake-up" signal, the active device transits its state to the active idle state, in step S330, and reports its state transition to the interrupt device, in step S331.

The active device analyzes the passive common memory, in step S340, and receives active broadcasting information of the coordinator by using the broadcasting information received and updated by the passive device, in step S341. Then, the active device analyzes the received active broadcasting information and records the related information on the passive common memory, in step S350.

Subsequently, the active device sets the passive device operation timer so as to transit its state to the passive idle state, in step S360, and transmits a "passive device operation" inquiry signal to the interrupt device 123 to determine whether or not the passive device is in operation, in step S370.

The device is operated with the active device using the power source until the interrupt device informs the active device that the passive device is in operation.

Therefore, the embodiment of the present invention prevents a wrong operation of the passive device caused by a breakdown of the passive device or any environmental effect, and provides smooth service.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the aforementioned construction of the present invention, the interrupt device having simple functions is used to control the mutual operations between the active and passive communication devices, thus reducing power consumption caused by a periodic state transition and extending the waiting time and hence the operating time of terminal equipment. In addition, the system of the present invention has a remarkable effect of providing smooth communication service even when the passive device is not in operation due to an environmental effect or instrument trouble.

What is claimed is:

1. A control method for an operation of a communication device, which includes a passive device for performing a passive communication function, an active device for performing an active communication function, and an interrupt device, the method comprising:

(a) the active device activating the interrupt device to monitor an operation of the passive device, when power is on and wherein the interrupt device monitors the operation of the passive device for a predetermined time by using a passive device timer;

(b) upon receiving passive broadcasting information, the passive communication device recording the broadcasting information on a common memory, and reporting reception of the passive broadcasting information to the interrupt device;

(c) the interrupt device reporting the reception of the passive broadcasting information to the active device; and (d) the active device transitioning a state of the active device to a passive idle state;

wherein the step (d) further includes:

the interrupt device waiting for an active signal from the passive device for the predetermined time by using the passive device timer; and if not receiving the active signal from the passive device within the predetermined time, the interrupt device activates the active device, wherein the active device, after activation, is to receive and analyze active broadcasting information, and to record related information on the common memory.

2. The control method as claimed in claim 1, wherein the active device, after activated by the interrupt device, transitions the state to an active idle state.

3. The control method as claimed in claim 1, further comprising:

(e) upon receiving passive broadcasting information including paging information, the passive device comparing a reception number with a device ID thereof;

(f) the passive device transmitting a paging-related signal to the interrupt device, when the reception number matches the device ID;

(g) upon receiving the paging-related signal, the interrupt device waking up the active device for activation and transiting the state to an active device idle state; and (h) the active device analyzing the paging information to perform a connection setting procedure.

4. The control method as claimed in claim 3, further comprising:

maintaining the passive device idle state, when the reception number does not match the device ID.

5. The control method as claimed in claim 1, wherein the communication device further includes a passive common memory, the control method further comprising:

recording the received passive broadcasting information on the passive common memory.

6. A communication device, comprising:

an active communication device for performing communication by using a power source thereof;

an active communication device antenna being used for signal transmission/reception of the active communication device;

a passive communication device for performing communication by using an electric field or a magnetic field provided by a coordinator;

a passive communication device antenna being used for signal transmission/reception of the passive communication device;

a passive common memory;

an interrupt device for monitoring an operation of the passive communication device and transmitting the monitoring result to the active communication device; and a first passive central processor unit (CPU) receiving power from the electric field or the magnetic field for controlling the operations of the passive communication device and a second CPU receiving power from the power source and controlling the active communication device, wherein the interrupt device waits for an active signal from the passive communication device for a predetermined time by using a passive device timer; and if not receiving the active signal from the passive communication device within the predetermined time, the interrupt device activates the active communication device, wherein the active communication device, after activation, is to receive and analyze active broadcasting information, and to record related information on the passive common memory.

* * * * *